(12) United States Patent
Meltser

(10) Patent No.: US 7,226,529 B2
(45) Date of Patent: Jun. 5, 2007

(54) ELECTROLYZER SYSTEM TO PRODUCE GAS AT HIGH PRESSURE

(75) Inventor: Mark A Meltser, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 416 days.

(21) Appl. No.: 10/677,600

(22) Filed: Oct. 2, 2003

(65) Prior Publication Data

US 2005/0072688 A1    Apr. 7, 2005

(51) Int. Cl.
*C25B 9/08* (2006.01)
*C25B 15/02* (2006.01)
*C25B 15/08* (2006.01)
*C25B 1/10* (2006.01)

(52) U.S. Cl. .................. 204/263; 204/252; 205/628; 205/637

(58) Field of Classification Search .............. None
See application file for complete search history.

(56) References Cited

U.S. PATENT DOCUMENTS

| | | | | |
|---|---|---|---|---|
| 4,107,277 A | * | 8/1978 | da Rosa | 423/359 |
| 4,457,823 A | * | 7/1984 | LaConti et al. | 204/282 |
| 4,758,322 A | * | 7/1988 | Sioli | 204/255 |
| 5,690,797 A | * | 11/1997 | Harada et al. | 204/228.5 |
| 5,888,361 A | | 3/1999 | Hirai et al. | |
| 6,036,827 A | | 3/2000 | Andrews et al. | |
| 6,153,083 A | | 11/2000 | Hofmann et al. | |
| 6,309,521 B1 | | 10/2001 | Andrews et al. | |
| 6,544,978 B2 | * | 4/2003 | Wu et al. | 514/211.06 |
| 2003/0141200 A1 | * | 7/2003 | Harada | 205/637 |
| 2004/0072040 A1 | * | 4/2004 | Duffy et al. | 429/21 |

FOREIGN PATENT DOCUMENTS

JP    09-291386 A    * 11/1997

OTHER PUBLICATIONS

Colling, Arthur K. and Roy, Robert J., Hamilton Standard, a division of United Technologies Corporation, "High Differential Pressure, Solid Polymer Electrolysis", pp. 1-6, Publisher is unknown, Date of Publication is unknown but believed to be prior to Oct. 2002, Place of Publication is unknown.

(Continued)

*Primary Examiner*—Harry D. Wilkins, III
(74) *Attorney, Agent, or Firm*—Harness, Dickey & Pierce, P.L.C.

(57) ABSTRACT

An apparatus and method to produce hydrogen gas a high pressure is disclosed. An electrolyzer is located inside a pressure vessel that is pressurized with high pressure water. The high pressure water is provided to both the anode and cathode sides of the electrolyzer by a pump in the pressure vessel Oxygen produced at the high pressure on the anode side of the electrolyzer is vented directly into the pressure vessel while hydrogen produced at the high pressure on the cathode side is routed to a separator and is deadheaded. The high pressure hydrogen is periodically routed from the separator to a storage tank by a pressure regulator.

28 Claims, 1 Drawing Sheet

OTHER PUBLICATIONS

General Electric Aircraft Equipment Division Report, Direct Energy Conversion Programs, "Electrochemical Oxygen Concentrator as an Oxygen Compressor," Contract NAS 2-7676, pp. i-129, Publication Date believed to be prior to Oct. 2002.

Leonida, Andrei and Roy, Robert J., of Hamilton Sundstrand Corporation, Windsor Locks, CT, Proceedings of the 39th Power Sources Conference conducted Jun. 12-15, 2000, "Hydrogen Generation by Electrolysis of Water", pp. 228-231.

McElroy, J. F., 1990 Fuel Cell Seminar conducted Nov. 25-28, 1990 in Phoenix, Arizona and coordinated by Courtesy Associates, Inc., Washington, D.C., pp. 282-285.

* cited by examiner

ELECTROLYZER SYSTEM TO PRODUCE GAS AT HIGH PRESSURE

FIELD OF THE INVENTION

The present invention relates to hydrogen production and, more particularly to high pressure hydrogen gas production with an electrolyzer.

BACKGROUND OF THE INVENTION

Hydrogen is used as a fuel in many applications today, including in fuel cells producing electric power. Fuel cells have also been proposed for use in electrical vehicular power plants to replace internal combustion engines. With the increased use of hydrogen as a fuel source, better methods of producing hydrogen gas are needed.

A common way to produce hydrogen gas is by electrolysis of water. In addition to producing hydrogen, electrolysis of water also produces oxygen. The generation of hydrogen and oxygen by electrolysis of water is performed in an electrolyzer. An electrolyzer is comprised of a plurality of cells that each have an anode side with an anode electrode and a cathode side with a cathode electrode. The anode and cathode electrodes are separated by a solid polymer electrolyte. A load or voltage (electrical potential) is applied across the anode and cathode electrodes while water is supplied to the anode side. Oxygen is generated on the anode side and excess water supplied to the anode side carries the oxygen and heat generated away from the cell. Hydrogen ions along with a small amount of the water are driven through the membrane by the electrical potential and, with the addition of electrons from the cathode, form hydrogen gas on the cathode side. The hydrogen gas and the protonic water are ported out of the cathode side of the cell. A plurality of such cells are stacked adjacent one another to form an electrolyzer capable of producing both hydrogen and oxygen gas with the addition of water and electrical potential.

Because the gases produced through water electrolysis are very pure and typically do not require additional processing, it is advantageous to match as closely as possible electrolysis pressure with that required for further processing or storage. Hydrogen, being a light gas, is preferably stored at high pressures (5,000–10,000$^+$ psi). These high pressures provide for economical storage of the hydrogen gas. Oxygen, likewise, is also preferably stored at high pressures. While production of hydrogen or oxygen at these higher pressures is desirable, a limitation of electrolyzers has been the inability to produce hydrogen or oxygen gas at these elevated or high pressures. The limitation on the pressure at which an electrolyzer can produce hydrogen or oxygen gas has been due to the structural limitations of the individual cells. That is, the structural configuration of the individual cells limit the magnitude of the pressure differential that can exist between the anode and cathode sides without the membrane failing or rupturing. To overcome these limitations, the electrolyzer was enclosed within a pressure vessel that was then pressurized with a blanket of inert gas (nitrogen). The pressurized nitrogen was provided to both the anode and cathode sides of the electrolyzer so that the electrolyzer could be operated at a higher overall pressure while maintaining a pressure differential between the anode and cathode sides of a magnitude that does not rupture or cause premature failure of the membrane. The use of a pressurized inert gas, however, lowered the efficiency of the electrolyzer due to the requirement to compress the nitrogen gas to the desired pressures. That is, specialized mechanical devices are necessary to compress the nitrogen to these elevated pressures and requires additional energy input to accomplish the compression. The efficiency of compressing nitrogen, even though heavier than hydrogen, and the complex controls necessary to accomplish this, reduce the overall efficiency of producing hydrogen and oxygen with the electrolyzer. In order to limit the necessity of utilizing pressurized gas to pressurize the anode and cathode sides of the electrolyzer, improvements were made on the inherent pressure capabilities of the electrolyzer itself. The improvements were made to the membrane support structure that is provided in each of these cells and which allow the cells to withstand, without damage, higher differential pressures than were previously possible. Current membrane support structures in electrolyzers allow pressure differentials between the anode and cathode sides of the electrolyzer of about 2,000 psi.

Thus, current electrolyzers are capable of producing hydrogen or oxygen gas at about 2,000 psi without the use of an inert gas to increase the pressure in the anode and cathode sides of the electrolyzer. By enclosing the electrolyzer within a pressure vessel pressurized by an inert gas that is supplied to both the anode and cathode sides of the electrolyzer, production of oxygen or hydrogen at pressures higher than 2,000 psi is possible. However, as stated above, the use of an inert gas to pressurize the anode and cathode sides of the fuel cells reduces the overall efficiency of the electrolyzer.

Accordingly, it is desirable to provide a method and apparatus to produce hydrogen or oxygen gas in an electrolyzer at high pressures (5,000–10,000$^+$ psi) in a more efficient and economical manner. To increase the efficiency, it is desirable to avoid the necessity of compressing an inert gas to pressurize a pressure vessel within which the electrolyzer is positioned.

SUMMARY OF THE INVENTION

The present invention provides an apparatus and method to produce hydrogen and/or oxygen gas at high pressure. The present invention utilizes pressurized water to elevate the operating pressures of both the anode and cathode sides of the electrolyzer thereby allowing the production of hydrogen and/or oxygen at high pressure. The present invention also provides a method for operating such an apparatus.

An electrolyzer system capable of producing hydrogen and/or oxygen at high pressure, according to the principles of the present invention, includes a pressure vessel having an interior cavity. An electrolyzer is located in the interior cavity of the pressure vessel. The electrolyzer has a first side which is one of an anode side and a cathode side. The electrolyzer also has a second side which is the other of the anode and cathode sides. The electrolyzer is operable to convert water and electricity into a hydrogen-containing stream on the cathode side and an oxygen-containing stream on the anode side. There is a pressurized water source that is operable to selectively supply pressurized water. There is a flow path from the pressurized water source to the interior cavity of the pressure vessel. The interior cavity receives pressurized water from the pressurized water source via the flow path. The pressurized water pressurizes the interior cavity of the pressure vessel. The pressurized water in the interior cavity of the pressure vessel is supplied to both sides of the electrolyzer. The electrolyzer uses the pressurized water along with an electrical current to produce the hydrogen-containing stream and the oxygen-containing stream.

The present invention also discloses a method of operating an electrolyzer system having an electrolyzer with a first side which is one of an anode side and a cathode side and a second side which is the other of the anode side and the cathode side and which is located in the interior cavity of a pressure vessel. The method includes: (1) selectively supplying pressurized water to the interior cavity of the pressure vessel; (2) pressurizing the interior cavity of the pressure vessel with the pressurized water; (3) supplying the pressurized water in the interior cavity to the first and second sides of the electrolyzer; (4) supplying electrical current to the electrolyzer; and (5) producing a hydrogen-containing stream in the cathode side and an oxygen-containing stream in the anode side from the current and the pressurized water.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
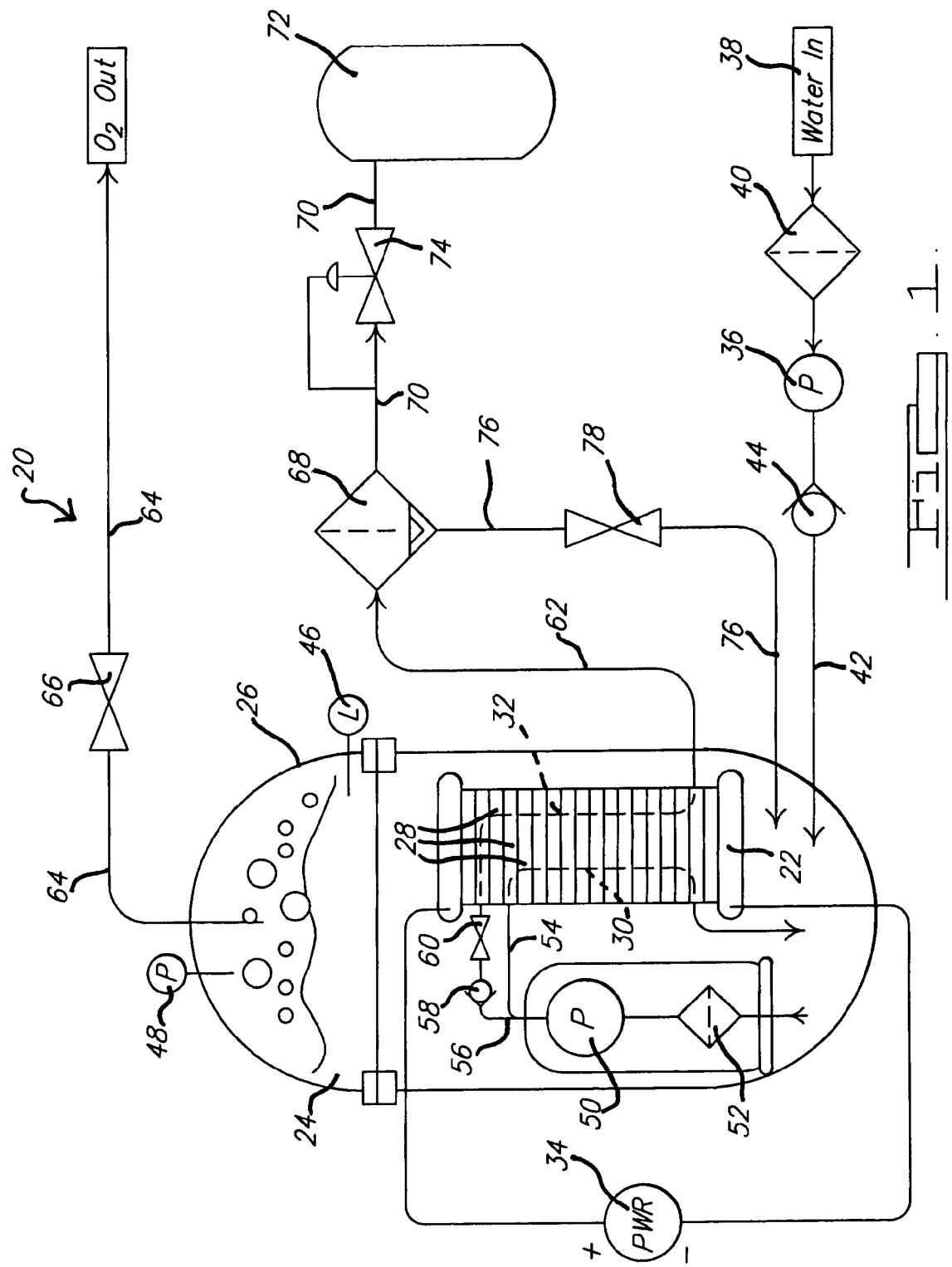
FIG. 1 is a schematic diagram of a preferred embodiment of an electrolyzer system according to the principles of the present invention.

The following description of the preferred embodiment is merely exemplary in nature and is in no way intended to limit the invention, its application, or uses.

Referring to FIG. 1, an electrolyzer system 20, according to the principles of the present invention is shown. Electrolyzer system 20 includes an electrolyzer 22 that is in an interior cavity 24 of a pressure vessel 26.

Electrolyzer 22 is comprised of a plurality of individual cells 28 that are stacked next to one another to form electrolyzer 22. Each cell 28 has a cathode electrode on a cathode side, an anode electrode on an anode side and a solid polymer electrolyte that separates the cathode and anode electrodes. The anode sides of each of the cells 28 are connected together to form an anode flow path 30 which defines an anode side of electrolyzer 22 while each of the cathode sides of the cells 28 are connected together to form a cathode flow path 32 which defines a cathode side of electrolyzer 22. A power source 34 is connected to the anode and cathode electrodes and supplies a current to electrolyzer 22 to electrolyze the water on the anode side of electrolyzer 22. Power source 34 can take a variety of forms. For example, power source 34 can be a DC battery that is attached to the anode and cathode electrodes to provide an electric potential across each of the cells 28. Electrolyzer 22 is operable to electrolyze water on the anode side in the presence of electric current into oxygen while producing hydrogen on the cathode side. Such electrolyzers are known in the art and, therefore, are not discussed in further detail.

Preferably, electrolyzer 22 is designed to withstand a pressure differential between the anode and cathode sides of about 2,000 psi. It should be appreciated, however, that electrolyzer 22 does not need to be capable of withstanding a pressure differential between the anode and cathode sides of about 2,000 psi to be within the scope of the present invention. That is, the present invention allows for the production of hydrogen and/or oxygen at high pressures (5,000–10,000$^+$ psi) without the requirement that electrolyzer 22 be capable of withstanding a pressure differential between the anode and cathode sides of about 2,000 psi. The actual pressure differential across the anode and cathode sides for which electrolyzer 22 is built to withstand will vary depending upon the design of the electrolyzer system 20 within which electrolyzer 22 is employed along with the pressure requirements for the hydrogen or oxygen produced.

Pressure vessel 26 is a high pressure vessel that is capable of withstanding high pressures. The pressure to which pressure vessel 26 is designed to accommodate will vary depending upon the desired pressure of the hydrogen and/or oxygen produced. That is, if it is desired to produce hydrogen at 10,000 psi, pressure vessel 26 is designed to be capable of safely withstanding a pressure of greater than 10,000 psi.

Pressure vessel 26 is pressurized by water which is supplied to interior cavity 24 of pressure vessel 26 from a pressurized water source 36. Pressurized water source 36 can take a variety of forms. For example, pressurized water source 36 can be a high pressure water pump 36 which draws water from water source 38 and is capable of providing water at high pressures, such as 5,000–10,000$^+$ psi. Water flowing to pump 36 from water source 38 flows through a filter and de-ionization cartridge 40 prior to reaching pump 36. Pump 36 raises the pressure of the water to a high pressure and supplies the pressurized water to interior cavity 24 of pressure vessel 26 via flow path 42. A check valve 44 is located in flow path 42 and prevents water in interior cavity 24 from back flowing to pump 36.

Pump 36 is operated to maintain a desired level of pressurized water within interior cavity 24 and/or to maintain a desired pressure in interior cavity 24. To accomplish this, a level sensor 46 is attached to pressure vessel 26. Level sensor 46 detects the level of pressurized water in interior cavity 24. Level sensor 46 can take a variety of forms, such as a mechanical float. There is also a pressure sensor 48, such as a pressure gauge, that monitors the pressure in interior cavity 24. Level sensor 46 and pressure sensor 48 are connected to a microprocessor (not shown) that is used to control operation of pump 36. The microprocessor instructs pump 36 to provide pressurized water via flow path 42 to interior cavity 24 when the level of water in interior cavity 24 is below a desired amount and/or when the pressure in interior cavity 24 is below a desired amount.

A water recirculation pump 50 is located in interior cavity 24 of pressure vessel 26. Pump 50 draws pressurized water from interior cavity 24 through a filter and de-ionization cartridge 52 and pumps the pressurized water to the anode and cathode sides of electrolyzer 22 via respective flow paths 54 and 56 that connect to the respective anode and cathode flow paths 30 and 32. By providing the pressurized water at a high pressure to both sides of electrolyzer 22, hydrogen and oxygen can be produced at a high pressure without a high differential pressure existing across the anode and cathode sides of electrolyzer 22. Flow path 56 from pump 50 to cathode side of electrolyzer 22 has a check valve 58 that prevents backflow from cathode side of electrolyzer 22 along flow path 56. A control valve 60 is also located in flow path 56 to control the quantity of pressurized water supplied to the cathode side of electrolyzer 22 by pump 50. Preferably, pump 50 and cartridge 52 are a common integral unit that can be easily removed from interior cavity 24 of pressure vessel 26 to perform maintenance and/or change cartridge 52. Pump 50 is sized to provide an output pressure that is sufficient to overcome a pressure differential between the pressure in interior cavity 24 and the pressure in the anode and/or cathode sides of electrolyzer 22. That is, as is explained below, cathode side of electrolyzer 22 is operated to produce hydrogen at a pressure higher than the pressure in interior cavity 24. As such, pump 50 is sized to provide an output pressure sufficient to overcome the pressure differential between interior cavity 24 and the cathode side of electrolyzer 22. The magnitude of the pressure differential between interior cavity 24 and the cathode side of electrolyzer 22 will vary depending upon the design and operation of electrolyzer system 20. Preferably, electrolyzer system 20 is operated so that the pressure differential between the cathode side of electrolyzer 22 and the interior cavity 24 is equal to or less than about 100 psi. However, as stated above, electrolyzer 22 can be designed to withstand a pressure differential between the anode and cathode sides of about 2,000 psi. Thus, it is possible that electrolyzer system 20 can be operated with a pressure differential of about 2,000 psi between the cathode side of electrolyzer 22 and interior cavity 24 such that pump 50 needs to be capable of producing an output pressure of greater than about 2,000 psi.

Pressurized water supplied by pump 50 to the anode side of electrolyzer 22 flows through anode flow path 30 and into interior cavity 24. In other words, pump 50 provides a continuous supply of pressurized water via flow paths 54 and 30 to the anode side of electrolyzer 22, when being operated, which then flows into interior cavity 24 of pressure vessel 26. Pressurized water supplied to the cathode side of electrolyzer 22 via flow paths 56 and 32 flows through the cathode side and then exits the electrolyzer 22 and pressure vessel 26 via flow path 62 and on to downstream components, as described below. The flow of pressurized water through cathode side of electrolyzer 22 is not a continuous flow as is the case with the flow through the anode side. Rather, the flow of pressurized water through the cathode side of electrolyzer 22 is deadheaded and intermittently vented or exhausted from the cathode side to a downstream component, as described below.

Electrolyzer 22, as stated above, uses the pressurized water supplied to the anode and cathode sides along with the electric current supplied by power source 34 to produce oxygen on the anode side and hydrogen on the cathode side via electrolysis of the water on the cathode side of electrolyzer 22. As a result of the electrolysis, the fluid exiting the anode side of electrolyzer 22 and flowing into interior cavity 24 contains excess pressurized water that was not electrolyzed in electrolyzer 22 along with the oxygen produced in the anode side. The excess water joins with the pressurized water within interior cavity 24 and is recirculated via pump 50 back through electrolyzer 22 on either the anode or cathode sides. The oxygen that exits the anode side of electrolyzer 22 flows into interior cavity 24 and accumulates in a top portion of interior cavity 24. As the amount of oxygen in interior cavity 24 increases, the pressure in interior cavity 24 can also increase. Thus, the pressure in interior cavity 24 is comprised of the pressure of the pressurized water supplied via pump 36 plus the additional pressure caused by the production of oxygen in the anode side of electrolyzer 22 which is vented to interior cavity 24. The oxygen produced, therefore, is at a pressure at least equal to the pressure of the pressurized water supplied to the anode side of electrolyzer 22.

The oxygen in interior cavity 24 is intermittently removed from pressure vessel 26. To remove the oxygen, a flow path 64 is connected to an outlet on a top portion of pressure vessel 26. A valve 66 is located in flow path 64 and is operable to selectively allow the oxygen in interior cavity 24 to exit pressure vessel 26 through flow path 64. Valve 66 is connected to the microprocessor and operated to relieve pressure and/or purge oxygen from interior cavity 24. Oxygen flowing through flow path 64 and valve 66 can be routed to a desired downstream component (not shown) or vented to atmosphere, depending upon the design and purpose of electrolyzer system 20.

Hydrogen produced in the cathode side of electrolyzer 22 along with the pressurized water supplied to the cathode side flows from the cathode side of electrolyzer 22 to a separator 68 via flow path 62. Separator 68 separates the liquid water from the hydrogen gas via gravity. The hydrogen in separator 68 intermittently flows from separator 68 via flow path 70 to a pressurized storage tank 72. A pressure regulator 74, in this case in the form of a pressure regulating valve, is located in flow path 70. Regulator 74 detects the pressure in flow path 70 both upstream and downstream of the regulator and based on the pressure differential selectively opens to allow hydrogen in separator 68 to flow to storage tank 72 through regulator 74 via flow path 70. The pressure differential at which regulator 74 opens to allow hydrogen to flow from separator 68 to storage tank 72 is set to cause the pressure in the separator 68, flow path 62 and the cathode side of electrolyzer 22 to reach a desired hydrogen production pressure. That is, regulator 74 remains closed, causing cathode flow path 32 to be deadheaded, while hydrogen is produced in the cathode side of electrolyzer 22. As hydrogen is continued to be produced, the pressure in the cathode side of electrolyzer 22, flow path 62 and separator 68 increases until a sufficient pressure differential occurs which causes regulator 74 to open allowing a portion of the hydrogen in separator 68 to pass to storage tank 72. Thus, the pressure in the cathode side, flow path 62 and separator 68 consists of the pressure of the pressurized water plus the additional pressure caused by hydrogen production and regulator 74 is used to control the pressure at which hydrogen gas is produced by electrolyzer system 20. Regulator 74 thereby forms a closed loop control of the hydrogen gas produced in electrolyzer 22 with no reference to atmospheric pressure. Accordingly, regulator 74 can be set to cause electrolyzer system 20 to produce hydrogen at a desired pressure. For example, regulator 74 can be set to cause hydrogen produced in electrolyzer system 20 to exceed 5,000 psi before allowing the hydrogen to flow from separator 68 into storage tank 72. If desired, regulator 74 can be set to cause electrolyzer system 20 to produce hydrogen at even higher pressures, such as 10,000+ psi. Thus, regulator 74 provides a closed loop control of the pressure at which electrolyzer system 20 produces hydrogen.

The water that accumulates in separator 68 is forced or pushed back into interior cavity 74 through a flow path 76. Flow path 76 is connected to a lower portion of separator 68 and leads to interior cavity 24 of pressure vessel 26. A valve 78 is located in flow path 76 and is selectively operated to allow water in separator 68 to be pushed into interior cavity 24 through flow path 76. Valve 78 is controlled by the microprocessor and opens when the level of water in separator 68 exceeds a predetermined value. The water in separator 68 is pushed into the interior cavity by the pressure differential that exists between separator 68 and interior cavity 24. As stated above, the deadheaded production of hydrogen in the cathode side of electrolyzer 22 causes the pressure in separator 68 to exceed that of interior cavity 24. The pressure differential between separator 68 and interior cavity 24 thus forces or pushes the water in separator 68 into interior cavity 24 when valve 78 is opened.

In operating electrolyzer system 20, interior cavity 24 is pressurized by supplying pressurized water via pump 36 to interior cavity 24. The pressurized water in interior cavity 24 is supplied to both the anode and cathode sides of electrolyzer 22 via pump 50. Because both the anode and cathode sides of electrolyzer 22 are provided with pressurized water via pump 50, the pressure differential across the anode and cathode sides of electrolyzer 22 is initially about zero prior to the production of hydrogen in the cathode side. The pressurized water supplied to the anode side is allowed to flow through the anode side via anode flow path 30 and flow back into interior cavity 24. The pressurized water supplied to the cathode side of electrolyzer 22 is deadheaded due to regulator 74 being normally closed. Electric current is supplied to the electrolyzer 22 via power source 34. Electric current in conjunction with the pressurized water on the anode and cathode sides of electrolyzer 22 cause electrolyzer 22 to electrolyze the water and form hydrogen on the cathode side and oxygen on the anode side. Once hydrogen and oxygen production are begun by electrolyzer 22, the oxygen produced in the anode side flows through the anode flow path 30 and into interior cavity 24 of pressure vessel 26, while hydrogen produced on the cathode side is deadheaded in that it does not flow past separator 68 until regulator 74 opens. As the oxygen continues to be produced on the anode side, the pressure in interior cavity 24 and in the anode side of electrolyzer 22 will increase slightly due to the oxygen production that is contained within the anode side and interior cavity. Likewise, as the hydrogen gas is produced on the cathode side, pressure in the cathode side along with in flow path 62 and separator 68 will increase due to the hydrogen production. The volume within which the hydrogen gas is contained (the cathode side of electrolyzer 22, flow path 62 and separator 68) is significantly smaller than the volume within which the oxygen gas is stored (interior cavity 24 and anode side of electrolyzer 22). Due to the smaller volume for the hydrogen containment, the pressure on the cathode side of electrolyzer 22, flow path 62 and separator 68 will increase more rapidly than the pressure in the anode side and interior cavity 24. Thus, a pressure differential will develop across the membrane separating the anode and cathode sides of electrolyzer 22. The pressure differential across the anode and cathode sides of electrolyzer 22 will continue to increase until a desired hydrogen pressure is reached at which time regulator 74 will automatically open to allow hydrogen to flow to storage tank 72 thus reducing the pressure on the cathode side of electrolyzer 22 and diminishing the pressure differential across the anode and cathode sides. Once the pressure in the cathode side of electrolyzer 22 falls below a certain level, regulator 74 closes thus causing the production of hydrogen and the elevation of pressure on the cathode side of electrolyzer 22 to begin again.

Check valve 58 on flow path 56 prevents the pressure differential between the anode and cathode sides from causing the water and/or hydrogen on the cathode side from backing up into pump 50 and/or the anode side of electrolyzer 22. Valve 60 is used to control the quantity of pressurized water supplied to the cathode side via pump 50. That is, pump 50 is operated to provide a continuous flow of pressurized water to electrolyzer 22 and valve 60 allows a controlled quantity to flow to the cathode side while a continuous flow occurs through the anode side via the anode flow path 30. Thus, the continuous flow is proportioned between the anode and cathode sides by valve 60 which limits and/or prevents the quantity of pressurized water flowing to the cathode side from pump 50.

Periodically, the microprocessor will open valve 78 to cause water in separator 68 to flow back into interior cavity 24 due to the pressure differential between separator 68 and interior cavity 24. Additionally, as oxygen builds up in interior cavity 24, the microprocessor intermittently opens valve 66 to allow the oxygen in interior cavity 24 to be vented out of pressure vessel 26 via flow path 64. The microprocessor intermittently or continuously monitors the pressure and level of pressurized water in interior cavity 24 via pressure sensor 48 and level sensor 46. Depending upon the pressure and/or level in interior cavity 24, high pressure water pump 36 is selectively operated to provide additional pressurized water to interior cavity 24. Thus, the electrolyzer system 20 is continuously operated and adjusted to produce hydrogen gas at high pressures without the use of complex control schemes or the use of less efficient mechanical compression of the gases produced by electrolyzer 22.

Electrolyzer system 20, according to the principles of the present invention provides a method of producing hydrogen and oxygen gas at high pressures (5,000–10,000$^+$ psi). The high pressure production is accomplished without the use of expensive and complicated compressors that can compress a gas to these high pressures. The high pressure production is also accomplished without subjecting electrolyzer 22 to pressure differentials across the anode and electrode sides that can cause damage or rupture the membranes in electrolyzer 22. Because of the high pressures at which hydrogen gas is produced, the hydrogen can be routed directly to a storage tank. Thus, electrolyzer system 20 according to the principles of the present invention provides a simple, efficient and economical way of producing hydrogen gas at high pressures that can be routed directly to storage devices.

While the electrolyzer system 20 has been shown and described with reference to a specific configuration for the production of hydrogen gas at higher pressures than oxygen gas, it should be understood that the anode and cathode sides of electrolyzer 22 can be switched so that higher pressure oxygen is produced and routed out of pressure vessel 26 while the hydrogen produced is exhausted into the interior cavity 24 of pressure vessel 26. Thus, the present invention provides and apparatus and method for production of high pressure hydrogen and oxygen gas.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrolyzer system comprising:
   a pressure vessel having an interior cavity;
   an electrolyzer having a first side which is one of an anode side and a cathode side and a second side which is the other of said anode and cathode sides, said electrolyzer operable to convert water and electricity into a hydrogen-containing stream on said cathode side and an oxygen-containing stream on said anode side, said electrolyzer located in said interior cavity of said pressure vessel;
   a pressurized water source operable to selectively supply pressurized water;
   a flow path from said pressurized water source to said interior cavity of said pressure vessel, said interior cavity receiving pressurized water from said pressurized water source via said flow path and said pressurized water pressurizing said interior cavity of said pressure vessel;

a pump located in said interior cavity of said pressure vessel, said pump having an inlet communicating with said pressurized water in said interior cavity, an outlet communicating with inlets on each side of said electrolyzer, and said pump selectively supplies said pressurized water in said interior cavity to each side of said electrolyzer;

a first fluid conduit communicating with said pump outlet and a first one of said inlets on said electrolyzer;

a second fluid conduit communicating with said pump outlet and a second one of said inlets on said electrolyzer; and a flow regulator in said first fluid conduit operable to selectively regulate flow of pressurized water through said first fluid conduit supplied by said pump, wherein said pressurized water in said interior cavity of said pressure vessel is supplied to both sides of said electrolyzer and said electrolyzer uses said pressurized water along with an electrical current to produce said hydrogen-containing stream and said oxygen-containing stream.

2. The system of claim 1, wherein each side of said electrolyzer has an inlet and an outlet, each inlet receiving said pressurized water from said interior cavity, said first side outlet being connected to a flow path that routes a first side stream out of said pressure vessel, and said second side outlet routing a second side stream into said interior cavity.

3. The system of claim 2, further comprising a valve in said flow path from said first side outlet, said valve selectively allowing said first side stream to flow from said first side through said flow path out of said pressure vessel.

4. The system of claim 3, wherein said valve regulates a pressure of said first side stream.

5. The system of claim 4, further comprising a pressurized storage device to which said flow path leads and wherein said valve is a closed-loop regulator that regulates said pressure of said first side stream by selectively allowing said first side stream to flow into said pressurized storage device through said closed-loop regulator by comparing said pressure in said first side of said electrolyzer with a pressure in said pressurized storage device.

6. The system of claim 5, further comprising a separator located in said flow path between said first side outlet and said valve, said separator separating said first side stream into at least a gas and liquid water, said separator having a first outlet through which said gas flows and a second outlet through which said liquid water flows, and said second outlet is connected to a flow path that directs said liquid water into said interior cavity of said pressure vessel.

7. The system of claim 1, wherein said source of pressurized water is a high pressure water pump.

8. The system of claim 1, wherein said first side is said cathode side and said second side is said anode side.

9. The system of claim 1, wherein said pressurized water supplied to at least one side of said electrolyzer is regulated.

10. The system of claim 1, further comprising a level indicator indicating a level of said pressurized water in said interior cavity and wherein said pressurized water source selectively supplies said pressurized water based on said level of said pressurized water.

11. The system of claim 1, further comprising:

a flow path from an upper portion of said interior cavity out of said pressure vessel through which gas in said upper portion can flow; and a valve in said flow path from said upper portion, said valve selectively allowing said gas to flow through said flow path and out of said pressure vessel.

12. The system of claim 11, wherein said valve and said source of pressurized water control a pressure in said interior cavity.

13. The system of claim 1, wherein said interior cavity is pressurized to greater than about 5,000 psi.

14. The system of claim 1, wherein said interior cavity is pressurized to greater than about 10,000 psi.

15. The system of claim 1, wherein a pressure difference between said anode and cathode sides is less than about 2,000 psi.

16. The system of claim 1, wherein said electrolyzer is submerged in said pressurized water in said interior cavity.

17. The system of claim 1, wherein said first one of said inlets on said electrolyzer is a cathode inlet to said cathode side of said electrolyzer and said second one of said inlets on said electrolyzer is an anode inlet to said anode side of said electrolyzer.

18. The system of claim 17, wherein during operation of said pump a continuous flow of pressurized water flows through said anode side.

19. The system of claim 17, wherein said flow regulator is a valve.

20. The system of claim 1, further comprising a check valve in said first fluid conduit between said pump outlet and said first one of said inlets.

21. The system of claim 1, wherein said second fluid conduit is unimpeded.

22. An electrolyzer system comprising:

a pressure vessel having an interior cavity:

an electrolyzer having a first side which is one of an anode side and a cathode side and a second side which is the other of said anode and cathode sides, said electrolyzer operable to convert water and electricity into a hydrogen-containing stream on said cathode side and an oxygen-containing stream on said anode side, said electrolyzer located in said interior cavity of said pressure vessel;

a pressurized water source operable to selectively supply pressurized water;

a flow path from said pressurized water source to said interior cavity of said pressure vessel, said interior cavity receiving pressurized water from said pressurized water source via said flow path and said pressurized water pressurizing said interior cavity of said pressure vessel;

a pump located in said interior cavity of said pressure vessel, said pump having an inlet communicating with said pressurized water in said interior cavity, an outlet communicating with inlets on each side of said electrolyzer, and said pump selectively supplies said pressurized water in said interior cavity to each side of said electrolyzer; and a pressure indicator indicating a pressure in said interior cavity, wherein said pressurized water in said interior cavity of said pressure vessel is supplied to both sides of said electrolyzer and said electrolyzer uses said pressurized water along with an electrical current to produce said hydrogen-containing stream and said oxygen-containing stream and wherein said pressurized water source selectively supplies said pressurized water based on said pressure in said interior cavity.

23. An electrolyzer system comprising:

a pressure vessel having an interior cavity;

an electrolyzer having a first side which is one of an anode side and a cathode side and a second side which is the other of said anode and cathode sides, said electrolyzer operable to convert water and electricity into a hydrogen-containing stream on said cathode side and an oxygen-containing stream on said anode side, said electrolyzer located in said interior cavity of said pressure vessel;

a pressurized water source operable to selectively supply pressurized water;

a flow path from said pressurized water source to said interior cavity of said pressure vessel, said interior cavity receiving pressurized water from said pressurized water source via said flow path and said pressurized water pressurizing said interior cavity of said pressure vessel; and a pump operable to circulate pressurized water in said interior cavity through said cathode and anode sides of said electrolyzer, operation of said pump generating a continuous flow of pressurized water through said anode side of said electrolyzer and an intermittent flow of pressurized water through said cathode side of said electrolyzer, and said electrolyzer uses said pressurized water along with an electrical current to produce said hydrogen-containing stream and said oxygen-containing stream.

24. The system of claim 23, further comprising:

a first fluid conduit communicating with an outlet of said pump and said cathode side of said electrolyzer;

an unimpeded second fluid conduit communicating with said outlet of said pump and said anode side of said electrolyzer; and a flow regulator in said first fluid conduit operable to selectively regulate flow of pressurized water through said first fluid conduit supplied by said pump.

25. The system of claim 24, further comprising a check valve in said first fluid conduit between said pump outlet and said cathode side of said electrolyzer.

26. The system of claim 25, wherein said pump is disposed within said interior cavity.

27. The system of claim 23, wherein said pump is disposed within said interior cavity.

28. An electrolyzer system comprising:

a pressure vessel having an interior cavity:

an electrolyzer having a first side which is one of an anode side and a cathode side and a second side which is the other of said anode and cathode sides, said electrolyzer operable to convert water and electricity into a hydrogen-containing stream on said cathode side and an oxygen-containing stream on said anode side, said electrolyzer located in said interior cavity of said pressure vessel;

a pressurized water source operable to selectively supply pressurized water;

a flow path from said pressurized water source to said interior cavity of said pressure vessel, said interior cavity receiving pressurized water from said pressurized water source via said flow path and said pressurized water pressurizing said interior cavity of said pressure vessel; and a pump located in said interior cavity of said pressure vessel, said pump having an inlet communicating with said pressurized water in said interior cavity, an outlet communicating with inlets on each side of said electrolyzer, and said pump selectively supplies said pressurized water in said interior cavity to each side of said electrolyzer, wherein said pressurized water in said interior cavity of said pressure vessel is supplied to both sides of said electrolyzer and said electrolyzer uses said pressurized water along with an electrical current to produce said hydrogen-containing stream and said oxygen-containing stream and wherein said cathode side of said electrolyzer can be selectively isolated from said interior cavity to prevent fluid communication between said cathode side and said interior cavity.

* * * * *